Oct. 2, 1928.
H. O. HEM
COIN CONTROLLED WEIGHING SCALE
Filed June 27, 1924
1,685,779
4 Sheets-Sheet 2
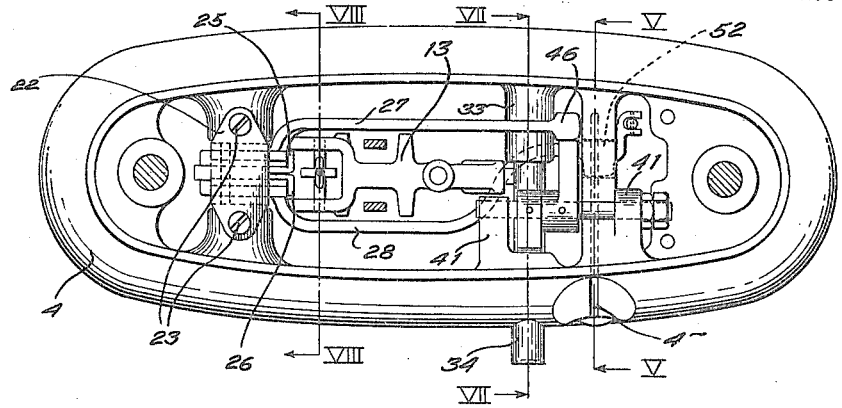
Fig. IV.
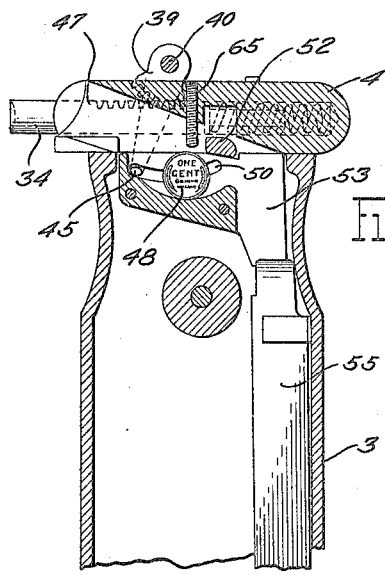
Fig. V.
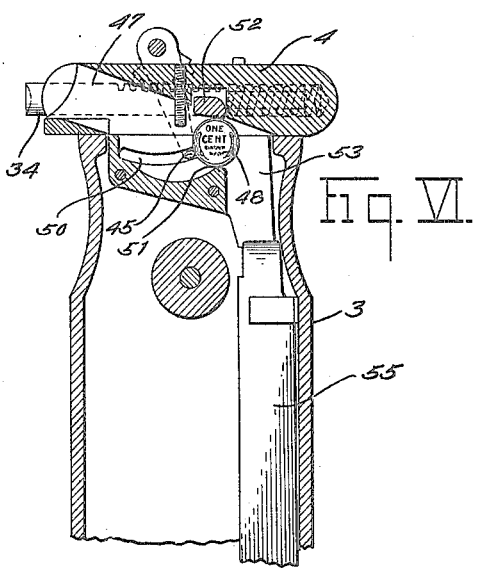
Fig. VI.
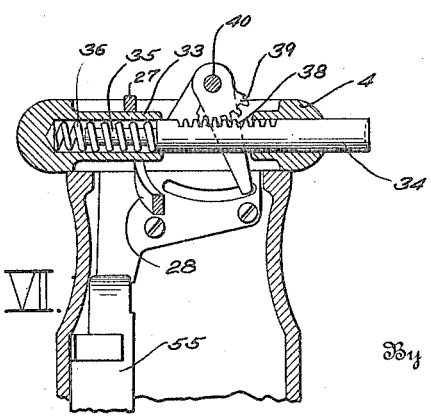
Fig. VII.
Inventor
HALVOR O. HEM.
By C. O. Marshall
Attorney Oct. 2, 1928.
H. O. HEM
1,685,779
COIN CONTROLLED WEIGHING SCALE
Filed June 27, 1924  4 Sheets-Sheet 3
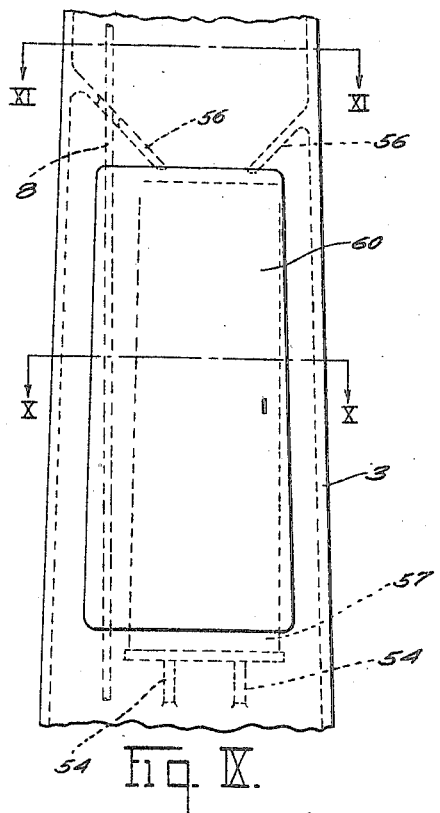
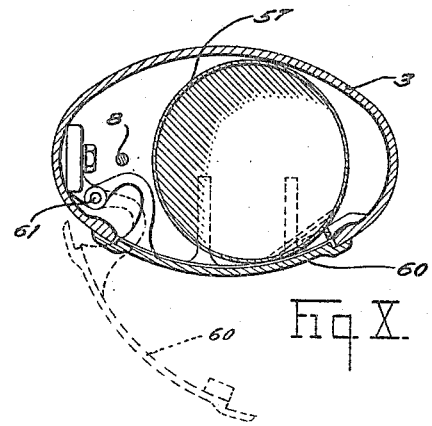
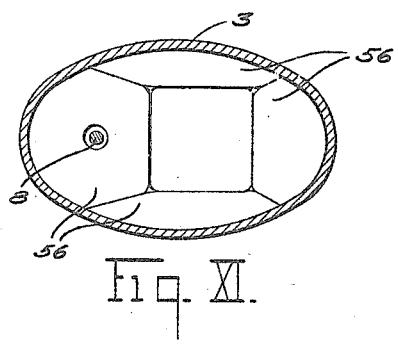
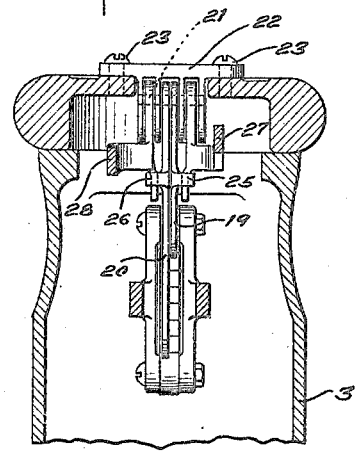
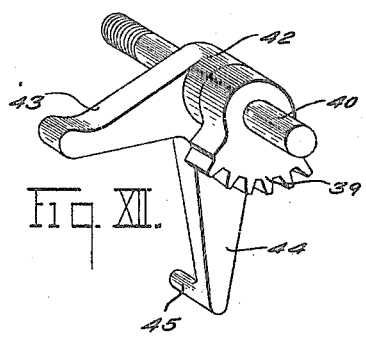
Inventor
HALVOR O. HEM.
By Co. Marshall
Attorney

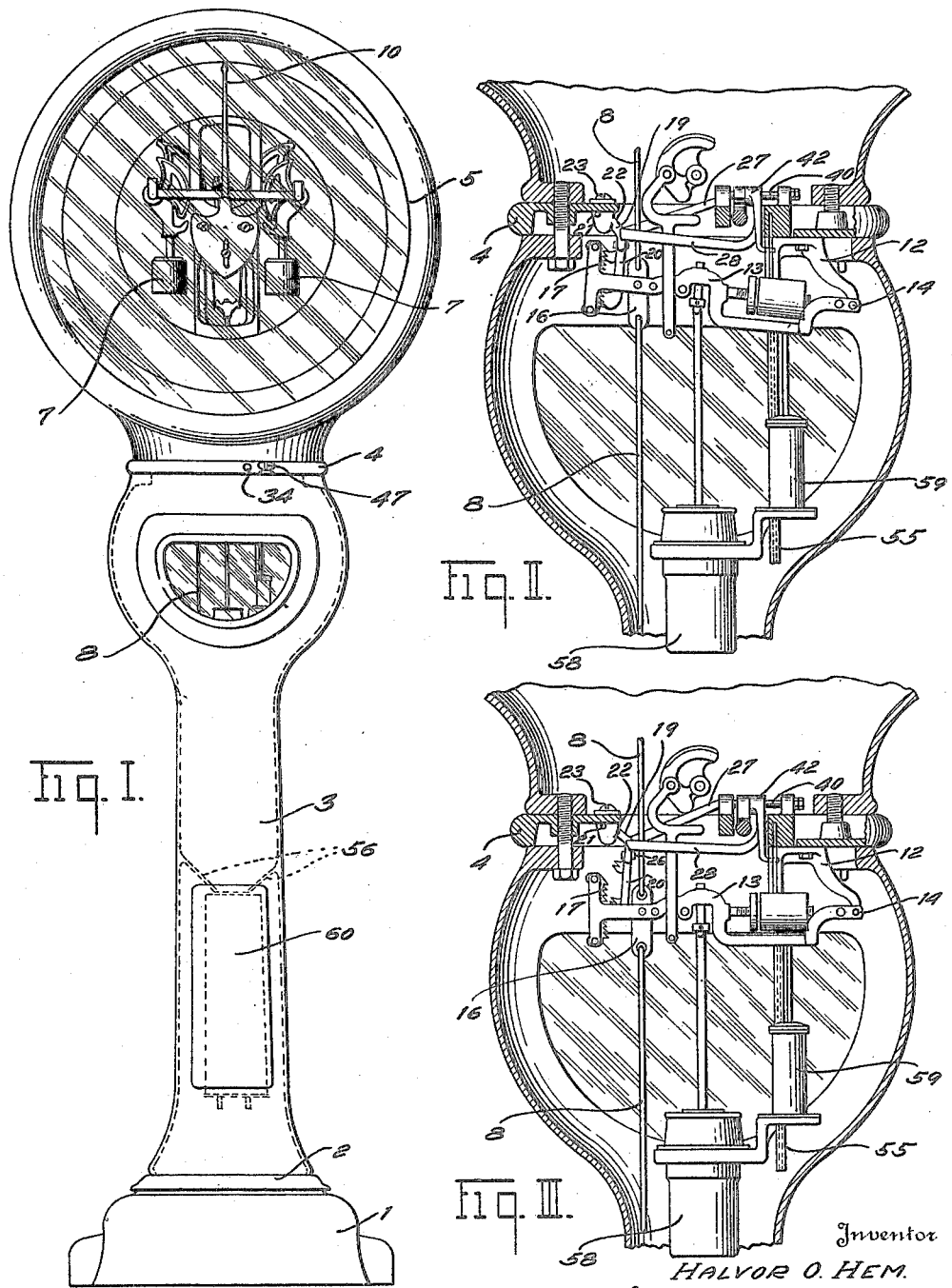

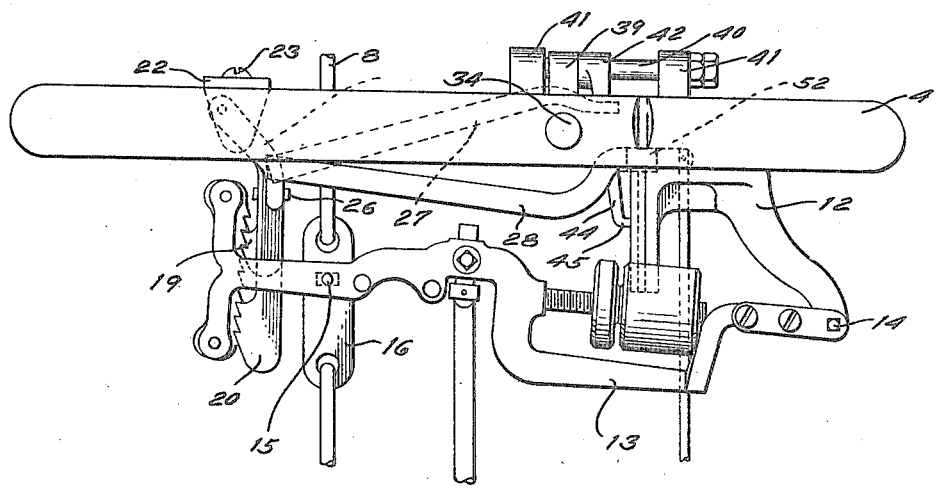
Fig. XIII.
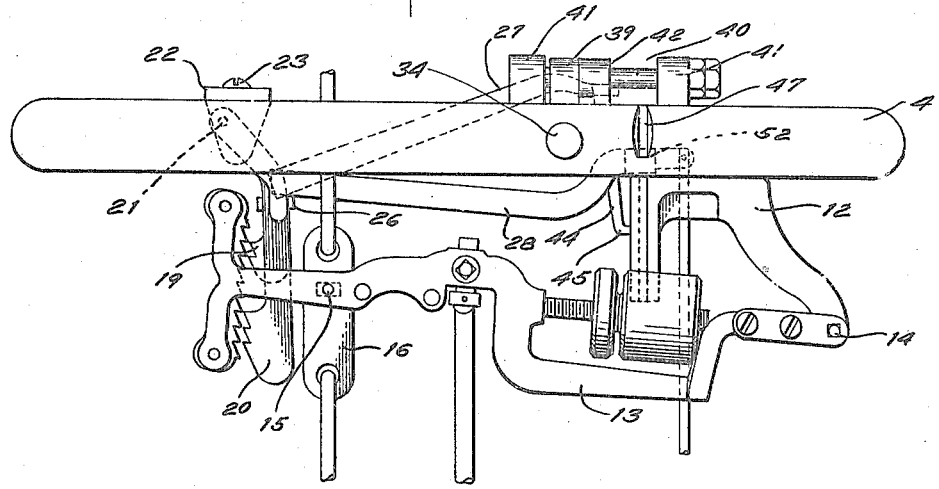
Fig. XIV.

Patented Oct. 2, 1928.

1,685,779

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

COIN-CONTROLLED WEIGHING SCALE.

Application filed June 27, 1924. Serial No. 722,650.

This invention relates to weighing scales, and more particularly to scales in which the load-counterbalancing and indicating mechanisms are normally locked against weighing movement but may be released by pressing a button or other manual operation.

One of the principal objects of my invention is to provide a weighing scale of this type in which the releasing mechanism is operable only upon the insertion of a coin which acts as a key forming a part of the releasing means.

Another important object of the invention is to provide means whereby the weighing mechanism is unlocked only after the discharge of the coin has progressed to a point where the same coin cannot be used for obtaining a subsequent weighing.

Another object of the invention is the provision of a coin-controlled weighing scale in which the device for releasing the load-counter-balancing and indicating mechanisms is simple, and sturdy and positive in its action.

A further object of the invention is the provision of a coin-controlled weighing scale of this type so constructed that only one weighing may be obtained for each coin inserted.

A further object is to provide a coin-controlled locking device which may be applied to person weighing scales of known construction without involving alterations in the weighing mechanism of the scale.

Another object is to so construct the coin-controlled locking mechanism that it can be assembled as a unit and can be incorporated in the scale or removed therefrom as a unit.

And still another object is the provision of a coin-controlled locking device which does not affect the accuracy of the scale.

Other objects and advantages will be apparent from the following specification, in which reference is had to the accompanying drawings illustrating a preferred embodiment of my invention and wherein similar reference numerals designate similar parts throughout the several views.

In the drawings:—

Figure I is a front elevational view of a weighing scale of the person weigher type embodying my invention;

Figure II is an enlarged fragmentary vertical sectional view showing some of the mechanism of the locking device and a part of the weighing mechanism in locked position;

Figure III is a similar view showing the scale mechanism in unlocked position;

Figure IV is a sectional plan view showing the coin-controlled locking device;

Figure V is a vertical sectional view taken substantially on the line V—V of Figure IV, showing a coin in the coin chute prior to the manual operation of the device;

Figure VI is a similar view showing the parts in the position assumed near the end of a manual operation;

Figure VII is a vertical sectional view taken substantially on the line VII—VII of Figure IV;

Figure VIII is a vertical sectional view taken substantially on the line VIII—VIII of Figure IV;

Figure IX is a fragmentary front elevational view of a part of the scale housing containing the coin receptacle, some of the parts inside the housing being shown in dotted lines;

Figure X is a sectional plan view taken substantially on the line X—X of Figure IX;

Figure XI is a sectional plan view taken substantially on the line XI—XI of Figure IX;

Figure XII is an enlarged isometric view of a sector and arms fixed upon a rock shaft and forming parts of the device of my invention;

Figure XIII is an enlarged fragmentary elevational view showing the coin-controlled mechanism in locking position; and Figure XIV is a similar view showing the coin-controlled mechanism in releasing position.

Referring to the drawings in detail, the base 1 of the scale supports and encloses the platform levers (not shown) which in turn support the platform 2. A hollow column 3 is supported upon the rear end of the base and extends upwardly therefrom and upon the upper extremity of the column is mounted a frame 4 which carries the coin-controlled locking mechanism. Superimposed upon the frame 4 is a substantially watch-case-shaped housing 5 which supports and encloses the load-counterbalancing mechanism of the scale.

The load-counterbalancing mechanism shown is substantially of the automatic pendulum type described in U. S. Patent No. 1,203,611, to Hapgood, dated November 7, 1916, and includes a pair of oppositely swinging pendulums 7 suitably connected by means of a steelyard rod 8 to the platform lever mechanism and adapted to swing outwardly and upwardly to counterbalance loads on the scale platform. The pendulum mechanism is suitably connected by means of a rack and pinion (not shown) to an indicator hand 10 which indicates the load upon a chart mounted within the housing 5 and visible through a glazed window in the face thereof.

Fixedly secured to the frame 4 is a bracket 12 having a depending arm to which a lever 13 is pivoted as at 14. The lever 13 is connected by means of a pin 15 to a link 16 interposed between sections of the steelyard rod 8, so that the lever 13 is swung on its pivot 14 as the steelyard rod 8 moves downwardly. When there is no load on the scale platform and the indicator hand 10 is in zero position, the lever 13 is in the position shown in Figure XIII.

Fixed to one end of the lever 13 is a serrated or notched bar 17, the teeth of which are normally in mash with the teeth of a pair of toothed fingers or pawls 19 and 20. The fingers 19 and 20 are pivoted on a pintle 21 carried by a bracket 22 which is fixedly secured to the frame 4 by means of screws 23. With the teeth of the fingers 19 and 20 engaged with the teeth of the notched bar 17 a load upon the platform of the scale will not affect the load-counterbalancing and indicating mechanism, because the lever 13 being locked against movement, the steelyard rod 8 cannot be pulled downwardly by the load. Each of the fingers 19 and 20 has a pair of ears 25 and 26. The ears 25 on the finger 19 loosely straddle a depending part of a lever 27, while the ears 26 on the finger 20 loosely straddle a depending part of the lever 28. The levers 27 and 28 are also pivoted upon the pintle 21 carried by the bracket 22, so that the fingers 19 and 20 and the levers 27 and 28 may swing together about the pintle 21. If the levers 27 and 28 are moved upwardly, the depending portions thereof will engage with one of the ears of each pair 25 and 26 to move the teeth of the fingers 19 and 20 out of mesh with the bar 17, thereby releasing the lever 13 so that a load on the platform may act through the steelyard rod 8 upon the load-counterbalancing and indicating mechanisms of the scale.

Projecting inwardly from the rear wall of the frame 4 is a boss 33, and slidably positioned in the frame 4 and boss 33 is a forwardly extending plunger 34 having a reduced portion 35 surrounded by an expansive spring 36 which is retained in a socket in the boss 33 and serves to resiliently hold the plunger 34 in its outermost position. The plunger 34 has a rack portion 38 which is constantly in mesh with the toothed segment 39 pinned or otherwise fixedly secured to a rock shaft 40 journaled in bosses 41 which are integral with and project inwardly from the frame 4.

Fixedly secured on the rock shaft 40 adjacent to the toothed segment 39 is a member 42 having outwardly projecting arms 43 and 44. When the toothed segment 39 is rotated by an inward movement of the plunger 34 the arm 43 engages the extremity of the lever 27, and the depending portion of the lever engaging one of the ears 25 swings the finger 19 about the pintle 21 and disengages the teeth of the finger from the teeth of the bar 17. This movement will not, however, release the lever 13 while the teeth of the finger 20 remain in mesh with the teeth of the bar 17.

The frame 4 is provided with a coin chute 47 which extends downwardly from its opening in the front of the frame so that a coin inserted in the chute will roll to the position shown in Figure V. A laterally turned finger 45 on the arm 44 extends into the coin chute through an arcuate slot 50 in one of the walls of the chute and as the arm 44 is swung about the axis of the rock shaft 40 by pressure on the plunger 34 the finger 45 moves through the chute from the position shown in Figure V to the position shown in Figure VI. If a coin has been inserted in the chute prior to such movement of the finger 45 the coin will be carried along the chute to the position shown in Figure VI and will thus be brought into engagement with a pad 52 constituting a part of the lever 28. Engagement of the coin with the pad 52 swings the lever about the pintle 21, and the depending portion of the lever engaging one of the ears 26 on the finger 20 swings the finger about the pintle 21 and thereby disengages the teeth of the finger from the teeth of the bar 17. The parts are so adjusted and arranged that when a coin has been placed in the coin chute the lever 28 is moved by engagement of the coin with the pad 52 before the arm 43 engages the lever 27. The lever 27 is not, in fact, moved upwardly by the arm 43 until after the coin reaches the position shown in Figure IV, so that a release of the lever 13 is effected after the coin is practically over the rise 51 in the bottom of the coin chute and cannot roll back into its original position in the chute upon release of the plunger 34 but must fall into the discharging part 53 of the chute. This feature of construction makes it impossible to obtain more than one weighing for each coin inserted.

When the coin is discharged through the portion 53 of the coin chute it falls through a substantially vertical tube or channel 55 into a coin receptacle 57 located within the lower part of the column 3. The function of the tube 55 is merely to guide the coin into the part of the column below which there are no projections or other obstructions upon which it may lodge, and in order to insure the coin's dropping into the receptacle, suitable guide vanes 56 are cast upon the inner walls of the column immediately above the coin receptacle. The coin receptacle is supported upon suitable brackets 54 cast or otherwise formed inside the column.

In order to prevent re-engagement of the teeth of the fingers 19 and 20 with the teeth of the toothed bar 17 before the scale mechanism has had time to come to rest in weighing position, I have connected a dash pot 59 to the lever 28, so that when the lever 28 has been raised or swung about the pintle 21 by engagement of a coin with the pad 52 the dash pot plunger will be raised and the teeth of the finger 20 will be held out of engagement with the teeth of the bar 17 until the plunger slowly sinks to a position adjacent the bottom of the dash pot. The large dash pot 58 shown in Figures II and III as connected to the lever 13 serves to damp the vibratory movement of the scale and bring it quickly to rest.

It will be seen upon examination of the drawing, particularly Figures III and XIII, that the teeth on the finger 19 engage the teeth of the bar 17 that are near the top, so that when the lever 13 is pulled downwardly by a load on the platform the teeth of the finger 19 cannot re-engage the teeth of the bar 17 until the load is removed. As soon, however, as the load is removed, the teeth of the finger 19 and the teeth of the bar 17 re-engage, even though the dash pot plunger has not had time to sink.

The teeth of the bar 13 are turned downwardly, while the teeth on the fingers 19 and 20 are turned upwardly, and the ears 25 and 26 of each pair are spaced sufficiently to permit the fingers to swing back and allow their teeth to ride over the teeth of the bar 17 when the lever moves upwardly after the load has been removed from the platform, so that the scale can return to zero position even though the locking mechanism has reassumed the normal position in which it is shown in Figure XIII.

Access to the coin receptacle is obtained by means of a locked door 60 in the front of the column 3, the door being hinged, as is shown at 61, so that it may when unlocked be swung open. When the door is open the coin receptacle may be lifted out of the column and its contents emptied. Any suitable lock may be employed for the door 60.

In order to prevent manipulation of the lever 28 by the insertion of a thin bar of metal in the coin chute, a threaded member 65 is fixed in the frame 4 with one of its ends extending into the coin chute in front of the pad 52. A coin may pass without interference beneath the member 65 but a straight bar, if inserted in the coin chute, will be obstructed by the member 65, and a bent instrument passed beneath the member 65 into engagement with the pad 52 will interfere with movement of the finger 45 and thus prevent the arms 43 and 44 from swinging about the axis of the rock shaft 40.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, weighing mechanism, and locking mechanism therefor, said locking mechanism having a member for preventing weighing movement of said weighing mechanism, releasable means for said member comprising means adapted to be engaged by a coin or the like, and manually operable means engageable with said coin whereby said coin forms a necessary element of said releasing mechanism, said locking mechanism having an additional member for preventing movement of said weighing mechanism and releasing means for said additional member, said releasing means being operated by said manually operable means subsequently to engagement of said coin with said coin engaged means.

2. In a weighing scale, in combination, weighing mechanism, a pair of locking means therefor, coin-controlled manually operable means for releasing one of said locking means, and manually operable means for releasing the other of said locking means.

3. In a weighing scale, in combination, weighing mechanism, a pair of locking means therefor, a common manually operable means for releasing both of said locking means, and means whereby a coin may be interposed between an element of said manually operable means and an element of one of said locking means to form an operative connection therebetween.

4. In a weighing scale, in combination, weighing mechanism, a pair of locking means therefor, a common manually operable means for releasing both of said locking means, and means whereby a coin may be interposed between an element of said manually operable means and an element of one of said locking means to form an operative connection therebetween, the other of said locking means being operated by said manually operable means without the imposition of a coin.

5. In a weighing scale, in combination, weighing mechanism, a pair of locking means therefor, a common manually operable means for releasing both of said locking means, and means whereby a coin may be interposed between an element of said manually operable means and an element of one of said locking means to form an operative connection therebetween, the other of said locking means being operated by said manually operable means without the imposition of a coin, the parts being so constructed and arranged that the last said locking means is released subsequently to the release of the coin-controlled locking means.

6. In a weighing scale, in combination, weighing mechanism, an element connected to said weighing mechanism and having a series of teeth, locking mechanism comprising a pair of members having teeth engageable with the teeth of said element, means for disengaging said members from said element, the parts being so constructed and arranged that one of said members cannot be re-engaged with said element while said weighing mechanism is in weighing position, and means for retarding re-engagement of the other of said members with said element.

7. In a weighing scale, in combination, weighing mechanism, an element connected to said weighing mechanism and having a series of teeth, locking means for said weighing mechanism including a pair of members having teeth engageable with the teeth of said element, manually operable releasing means adapted to act through a coin on one of said members and subsequently to discharge said coin, and means whereby said manually operable releasing means acts upon the other of said members subsequently to its action through such coin on the first of said members.

8. In a weighing scale, in combination, weighing mechanism, locking means for said weighing mechanism, and manually operable releasing means for said locking mechanism, comprising a push member, means adapted to be rocked by movement of said push member, a coin chute, an extension on said rockable means adapted to move a coin along said coin chute, means extending into said coin chute and adapted to be engaged by said coin, means whereby engagement of said coin with the last said means releases said locking means, additional locking means for said weighing mechanism, and means whereby further movement of said rockable means releases said additional locking means.

9. In a weighing scale, in combination, weighing mechanism, including a lever, said lever having a serrated member connected thereto, a pair of fingers having teeth to mesh with the teeth of said serrated member and thereby lock said lever against weighing movement, coin-controlled manually operable means for releasing the teeth of one of said fingers from the teeth of said member, and manually operable means for subsequently releasing the teeth of the other of said fingers from the teeth of said member.

10. In a weighing scale, in combination, weighing mechanism, dual locking means therefor, and releasing means for said dual locking means, comprising a plunger adapted to be forced inwardly, means adapted to be rocked by inward movement of said plunger, a coin chute, said rockable means having a part extending into said coin chute and adapted to move a coin therealong, means extending into said coin chute and adapted to be engaged by a coin when moved by said part, means whereby movement of said coin engaged means releases one element of said dual locking means, and means whereby further movement of said rockable member effects the release of the other element of said dual locking means.

11. In a weighing scale, in combination, weighing mechanism, locking mechanism, and releasing mechanism for said locking mechanism, said releasing mechanism having means whereby it is operative upon insertion of a coin, and means whereby the completion of its operation is retarded until the discharge of said coin has reached such a point that the operation of the releasing mechanism cannot be repeated with the same coin.

HALVOR O. HEM.